INVENTOR
MARTIN GRÖBITZ

ATTORNEY.

United States Patent Office 3,573,007
Patented Mar. 30, 1971

3,573,007
MEASURING SCALE DIVISION
Martin Gröbitz, Traunreut, Germany, assignor to Wenczler & Heidenhain, Traunreut, near Traunstein, Germany
Filed Aug. 9, 1968, Ser. No. 751,411
Claims priority, application Germany, Aug. 10, 1967, W 44,537
Int. Cl. B21d 21/00; C23f 1/02; G01d 15/00
U.S. Cl. 29—191                                                  8 Claims

ABSTRACT OF THE DISCLOSURE

A measuring scale division comprising a metallic carrier and a plurality of alternating light-reflecting and light-absorbing markings are provided on the metallic carrier. The markings of the measuring scale division comprise different metals.

---

The present invention relates to a measuring scale division, in general, and to an etched measuring scale division with alternating light-reflecting and light-absorbing markings on a metallic carrier, in particular. Measuring scale divisions of this type are used among other fields, in photoelectric position determining devices.

It is already known to produce measuring scale divisions with alternately light-reflecting and light-absorbing markings by etching of a metallic carrier polished at its division face.

The low, edge sharpness of the markings is a disadvantage in known etched measuring scale divisions, which for instance in its use in photoelectric position determining systems may lead to unsafety during the sensing.

It has been shown, that in measuring scale divisions with alternately light-reflecting and light-absorbing markings an appreciable improvement of the edge sharpness with simultaneous increase of the resistance against outer influences, as well as an increase of the reflection capacity of the markings is to be obtained, if the markings of the measuring scale division are made of different metals.

Particularly, fine lines can be obtained with the measuring scale of the present invention particularly for the reason, because the different metals cause in the etching electrolyte as local element, the dissolution of the less precious of the two metals. This effect can be obtained without electric current. By the application of a potential between the different metals, this effect can finally be enhanced or also influenced in a different direction.

The reflecting markings formed as an etching mask in accordance with the present invention can be precipitated on the metallic carrier either by evaporation in vacuum or galvanically whereby known photo-mechanical methods can be applied for the production of the etching mask which is resistant relative to the applied etching means for the metallic carrier.

In the production of the measuring scale division the following steps are taken:

(a) Providing the metallic carrier with a light-sensitive layer as well as exposure and development thereof;

(b) Covering of the carrier carrying the hardened parts of the light-sensitive layer with the thin metallic layer which is resistant to the etching means for the carrier;

(c) Removal of the hardened portions of the light-sensitive layer from the surface of the metallic carrier;

(d) Etching of the bare surface of the metallic carrier between the light reflecting markings forming the etching mask.

With these and other objects in view which will become apparent in the following detailed description, the present invention will be clearly understood in connection with the accompanying drawing, in which:

FIGS. 1-5 are sections through the carrier with the respective layers applied thereto during the steps of operation.

Figure 1:
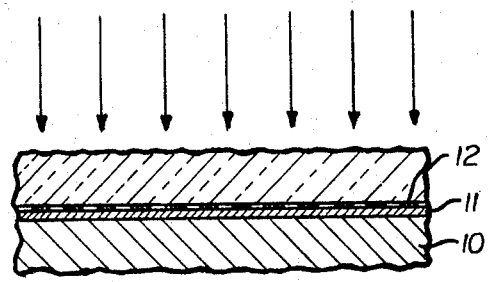
Figure 2:
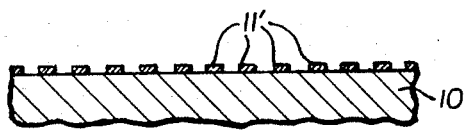
Figure 3:
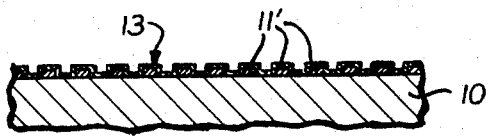
Figure 4:
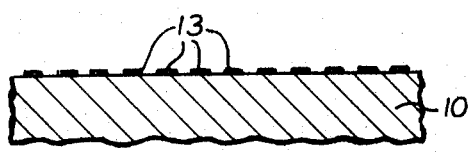

Referring now to the drawing, FIG. 1 discloses a metallic carrier 10 being covered with a light-sensitive layer 11 which is exposed to light by means of a pattern 12. If the layer 11 is treated with a suitable solvent, non-hardened parts thereof are removed, so that only the hardened parts 11' remain on the carrier 10, as is indicated in FIG. 2 of the drawing. In FIG. 3, the carrier 10 jointly with these hardened parts 11' are covered with one or a plurality of thin metal layers 13, which form the etching mask and are applied either by evaporation in vacuum or galvanically on the carrier 10. Thereafter, the layer combination 11', 13 is treated with a solvent, in which the remaining parts 11' of the light-sensitive layer 11 are dissolved, not, however, the metallic layer 13. By dissolution of the hardened parts 11' of the light-sensitive layer 11 the metallic layers 13 arranged thereover slide off also and adhere only on those parts at which they are engaged directly on the carrier 10 (FIG. 4).

Figure 5:
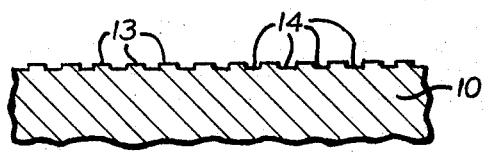

Thereafter, the bare surface of the metallic carrier 10 is etched, so that between the reflecting markings, formed by the layer 13, light-absorbing markings 14 are created as it is indicated in FIG. 5 of the drawing.

If the metallic carrier 10 is for instance of steel, then suitably the reflecting markings are gold layers, because the latter are not attacked by etching means for the carrier 10.

As reflecting markings which, in accordance with the present invention, constitute the etching mask, also additionally titanium, rhodium, platinum as well as silver layers or similar layers can be used.

The advantages of the present invention come forward particularly then, when the material forming the etching mask is a more precious metal than that of the carrier 10.

I claim:
1. An etched measuring scale division, comprising
   a carrier,
   a plurality of alternately light-reflecting and light-absorbing markings made of different metals, respectively,
   said light-reflecting markings of said measuring scale division formed as an etching mask on said carrier, and
   said light-absorbing markings constituting etched out portions of said carrier between said etching mask.
2. The measuring scale division, as set forth in claim 1, wherein
   said light-reflecting markings comprise at least one thin metallic layer, and
   said one thin metallic layer is resistant against etching means used for the production of said light-absorbing markings.
3. The measuring scale division, as set forth in claim 2, wherein
   said individual markings comprise a plurality of said layers.
4. The measuring scale division, as set forth in claim 2, wherein
   said carrier is metallic, and
   said metallic layer, applied to said metallic carrier, is of a more precious metal than that of said metallic carrier, so that during a previous etching a dissolution of said lesser precious metal is caused by local-element-formation.
5. The measuring scale division, as set forth in claim 1, wherein
   said carrier is metallic, said light-reflecting markings comprise at least one gold layer applied to said metallic carrier, and said at least one gold layer at the same time forms said etching mask for the etching of said light-absorbing markings.

6. The measuring scale division, as set forth in claim 1, wherein said light-reflecting markings comprise at least one layer of titanium, and said at least one layer of titanium at the same time forms said etching mask for the etching of said light-absorbing markings.

7. The measuring scale division, as set forth in claim 1, wherein said carrier is metallic, and said light-reflecting markings are applied to said metallic carrier by evaporation in vacuum.

8. The measuring scale division, as set forth in claim 1, wherein said carrier is metallic, and said light-reflecting layers are applied to said metallic carrier galvanically.

References Cited

UNITED STATES PATENTS

| 2,671,950 | 3/1954 | Sukacev | 29—191.4UX |
| 3,022,201 | 2/1962 | Quinn et al. | 29—199X |
| 2,559,389 | 7/1951 | Beeber et al. | 117—5.5UX |
| 3,284,175 | 11/1966 | Spence et al. | 29—199X |

FOREIGN PATENTS

| 1,070 | 1882 | Great Britain | 29—191.4 |
| 622,236 | 4/1949 | Great Britain | 156—3 |

ALLEN B. CURTIS, Primary Examiner

U.S. Cl. X.R.

29—199; 73—71.3; 156—3